United States Patent [19]

Farcy

[11] 4,112,390

[45] Sep. 5, 1978

[54] LASER GENERATOR DEVICE EMITTING AT A WAVELENGTH CLOSE TO 1.3 MICRONS

[75] Inventor: Jean-Claude Farcy, Briis sur Forges, France

[73] Assignee: Compagnie Generale d'Electricite S.A., Paris, France

[21] Appl. No.: 738,993

[22] Filed: Nov. 4, 1976

[30] Foreign Application Priority Data

Nov. 17, 1975 [FR] France ................. 75 34994

[51] Int. Cl.² .......................... H01S 3/10; H01S 3/23; H01S 3/16; H01S 3/22
[52] U.S. Cl. .............................. 331/94.5 G; 330/4.3; 331/94.5 E; 331/94.5 F; 331/94.5 M; 331/94.5 C
[58] Field of Search ............... 331/94.5 G, 94.5 C, 331/94.5 E; 330/4.3

[56] References Cited

U.S. PATENT DOCUMENTS

| 3,599,106 | 8/1971 | Snitzer | 331/DIG. 1 |
| 3,881,115 | 4/1975 | Hodgson et al. | 331/94.5 F |

OTHER PUBLICATIONS

Hohla et al., J. Appl. Physics, vol. 46, No. 2, Feb. 1975, pp. 808–809.

*Primary Examiner*—William D. Larkins
*Attorney, Agent, or Firm*—Sughrue, Rothwell, Mion, Zinn and Macpeak

[57] ABSTRACT

The invention relates to a laser generator device emitting at a wavelength of 1.3 microns. This device includes a laser oscillator with a neodymium-doped glass, an iodine gas amplifier disposed at the output of the oscillator and means for causing the emission of the oscillator to take place at a wavelength close to 1.3 microns. Application to the production of plasmas.

17 Claims, 4 Drawing Figures

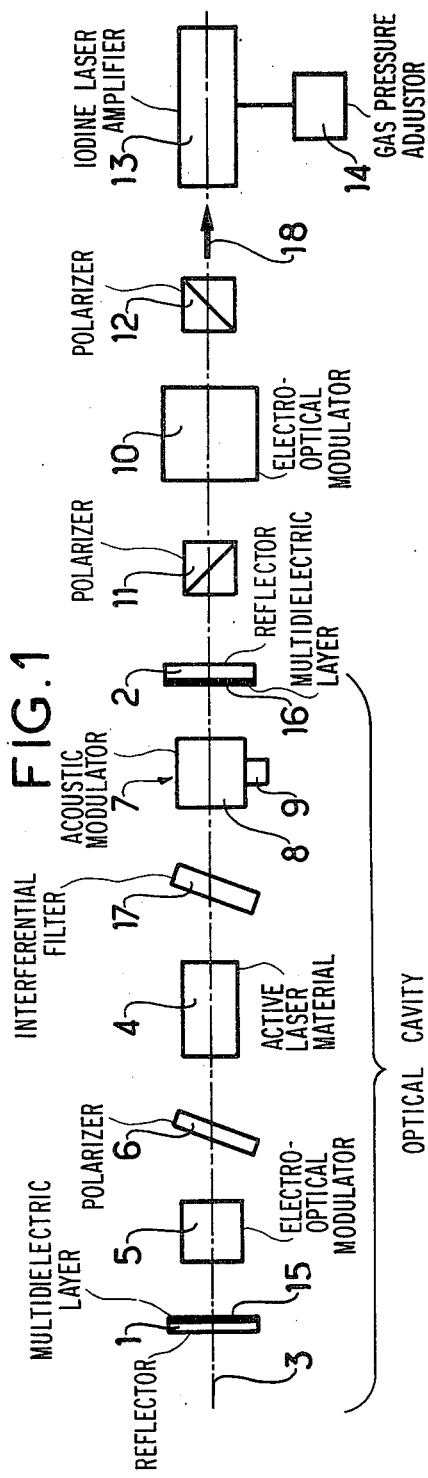
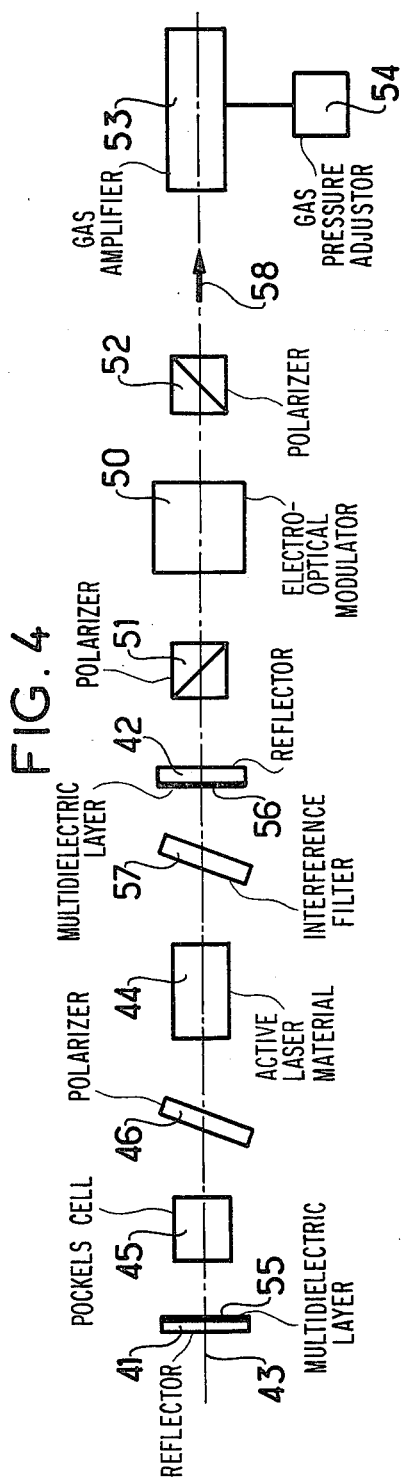

LASER GENERATOR DEVICE EMITTING AT A WAVELENGTH CLOSE TO 1.3 MICRONS

FIELD OF THE INVENTION

The present invention relates to laser generator devices which emit at a wavelength close to 1.3 microns and particularly, but not exclusively to laser generator devices which emit short high-power pulses at a wavelength close to 1.3 microns.

BACKGROUND OF THE INVENTION

It is known that it is possible to obtain a powerful laser pulse at a wavelength of 1.3 microns by means of a device having an iodine gas laser oscillator which emits a short pulse into an iodine amplifier disposed at the output of the oscillator.

The oscillator can either be of the Q-switched type with a pulse cutter or of the "locked mode" type emitting a series of successive pulses; the "locked mode" type of oscillator having a device suitable for selecting one pulse from the series. In both cases, the output signal obtained at the output of the oscillator has a duration in the order of one nanosecond or of a fraction of a nanosecond.

The above-described laser generator devices have the disadvantage of delivering output pulses whose power is limited.

This disadvantage is explained by the fact that it is difficult to obtain very short pulses in an iodine laser without considerably increasing the pressure of the active gas.

Also, the upper level of the iodine is excited by photodissociation.

This upper level has two sub-levels and the lower denergizing level of the excited electrons has four sub-levels. Therefore, in theory, the laser emission caused by the excitation of an iodine gas should have eight distinct lines each corresponding to the various transition combinations between the two upper sub-levels and the four lower sub-levels.. In actual fact, only six lines are permitted. In the known lasers described above, it is observed that in practice, the iodine oscillator emits on only one preferential wavelength which corresponds to the emission line which provides the greatest gain. In these conditions, the energy amplification in the amplifier takes place only at this preferential wavelength, this reducing the output power of the device.

It is possible to mitigate this disadvantage to some extent by increasing the active gas pressure in the amplifier. Indeed, the relaxation periods between the preferential de-energizing sub-level and the lower sub-levels are then reduced and their values tend to be brought closer to that of the duration of the pulse. The energy amplification then increases. But the power increase of the output pulses thus obtained is small.

An attempt was therefore made to operate the iodine oscillator on the various emission lines of iodine, e.g. by disposing in the cavity a Pérot-Fabry etalon (i.e. standard interference cavity) so as to modulate the gain on the various transitions. However, all the solutions brought forward have the disadvantage of being very difficult to implement. Preferred embodiments of the present invention mitigate the disadvantages of the above-described devices and produce a laser generator device suitable for emitting pulses having a wavelength of 1.3 microns with higher power than those produced according to the prior art.

SUMMARY OF THE INVENTION

The present invention provides a laser generator device emitting at a wavelength close to 1.3 microns. This device comprises: a laser oscillator suitable for emitting a light signal. The oscillation includes a resonant optical cavity formed by two reflectors, one of which is semi-transparent. An active material is provided and means for exciting this active material. Means are provided for triggering at least one light pulse in the cavity containing the excited active material; and at least one amplifier is disposed at the output of said oscillator, the amplifier comprises an active gas constituted by an iodine compound and means for exciting this active gas. The active material of the oscillator is an active material doped with neodymium and it has, moreover, selective means for allowing the passing in said amplifier of the radiation of said signal situated in a wavelength range covering the emission lines of the neodymium close to 1.3 microns and the various emission lines of said active gas, this wavelength range excluding the neodymium emission lines close to 1.06 and 0.9 microns.

Embodiments of the present invention are described hereinbelow by way of example of no limiting character and with reference to the accompanying drawings.

BRIEF DESCRIPTION OF THE DRAWINGS

FIG. 1 is a block diagram of a preferred embodiment of the device according to the invention;

FIG. 4 is a block diagram of another embodiment of the device according to the invention.

DESCRIPTION OF THE PREFERRED EMBODIMENT

Figure 2:
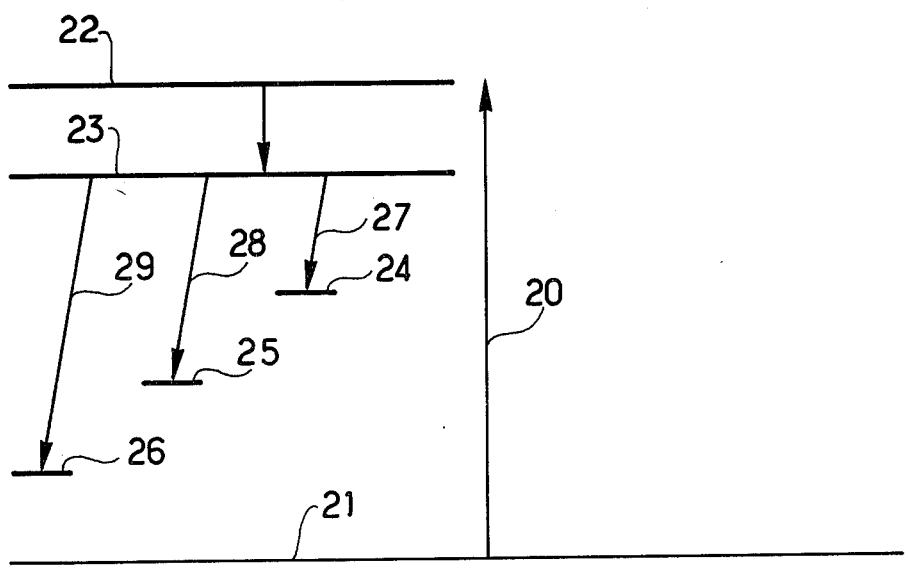
FIGS. 2 and 3 are energy level diagrams illustrating the description of the operation of the device shown in FIG. 1.

In FIG. 1, a resonant optical cavity is delimited by two reflectors 1 and 2 alined on an optical axis 3, the reflector 2 being semi-transparent. An active laser material 4 is disposed in the optical cavity. Means, not shown, are provided for exciting the active material 4, these means comprising, e.g. discharge tubes disposed round the active material 4. Means for triggering at least one light pulse are disposed inside the cavity, these means including an electro-optical modulator 5 such as a Pockels cell and a polarizer 6 such as an optical plate at the Brewster angle. The cavity also contains an acoustic modulator 7 which consists of a block of quartz 8 centred on the axis 3 and on which is fixed an electro-acoustic transducer 9.

A pulse selector device centred on the axis 3 is disposed on the outside of the cavity on the side nearest to the semi-transparent reflector 2. This selector device comprises an electro-optical modulator 10 such as a Pockels cell inserted between two crossed polarizers 11 and 12. Beyond the selector device, an iodine laser amplifier 13 centred on the axis 3 is constituted by a tube containing an active gas formed e.g. by a mixture of an iodine compound such as $C_3F_7I$ and argon. The device shown in FIG. 1 also comprises preferably means 14 for adjusting the active gas pressure of the amplifier 13, which pressure may be of the same order as the atmospheric pressure.

In one embodiment of the invention, the active material 4 is a neodymium-doped active material. This material consists e.g. of neodynium-doped glass and the device comprises selective means for allowing only that part of the radiation emitted by the oscillator which lies in a frequency range given below to pass through the amplifier. These selective means can comprise, as shown, multidielectric layers 15 and 16 deposited respectively on the reflecting surface of the reflectors 1 and 2 of the cavity and an interference filter 17 disposed in the cavity. But this frequency can also be selected by means of optical systems or a Pérot-Fabry etalon disposed in the cavity.

The resonant laser cavity formed by the reflectors 1 and 2, in which is disposed the neodymium-doped glass rod 4 provided with excitation means gives rise, by means of the acousto-optical modulator 7, to locked mode pulses. The electro-optical modulator 5 to which is associated the polarizer 6 enables a series of these pulses leaving the cavity through the semi-transparent reflector 2 to be triggered. The pulses of this series are all stopped except for one which constitutes a light signal entering the amplifier 13, shown by the arrow 18, by means of the electro-optical modulator 10 disposed between the crossed polarizers 11 and 12.

The wavelength of the signal is close to 1.3 microns. This result is obtained due to the presence of the multidielectric layers 15 and 16 and of the interferential filter 17, as explained hereinbelow.

FIG. 2 is a diagram of the energy levels of the neodymium-doped glass, these levels increasing in the direction of the arrow 20. In this diagram, a level 21 corresponds to the fundamental state occupied by the electrons when there is no excitation. Under the influence of an excitation e.g. of the light of a discharge tube, the electrons can pass from the level 21 to the upper level 22, from which they spontaneously fall back to a metastable level 23. The electrons occupying the level 23 subsequently fall back in the direction of the arrow 27 to the level 24 by emitting a radiation with a wavelength of 1.3 microns, or in the direction of the arrow 28 to the level 25, which is lower, by emitting a radiation with a wavelength of 1.06 microns, or lastly in the direction of the arrow 29 to the lowest level 26 by emitting a radiation with a wavelength of 0.9 microns. Of course, the diagram in FIG. 2 is very schematic: in reality each of the levels 22, 23, 24, 25 and 26 can be constituted by several sub-levels.

The radiation corresponding to the arrow 28, with a wavelength of 1.06 microns is that which provides the greatest gain and hence this emission wavelength is that which is generally used in neodymium-doped glass lasers. The laser oscillator shown in FIG. 1 emits, however, at the wavelength of 1.3 microns, in the direction of the arrow 27 in FIG. 2, due to the multidielectric cavities 15 and 16 which reflect the light in a narrow wavelength range comprising the neodynium-doped glass emission lines close to 1.3 microns and excluding the lines close to 1.06 microns and to 0.9 microns, these layers absorbing the light outside this range. The interferential filter 17 which fulfills exactly the same function as the layers 15 and 16 is used when it is necessary to reduce the width of the wavelength range defined by the multidielectric layers 15 and 16.

Figure 3:
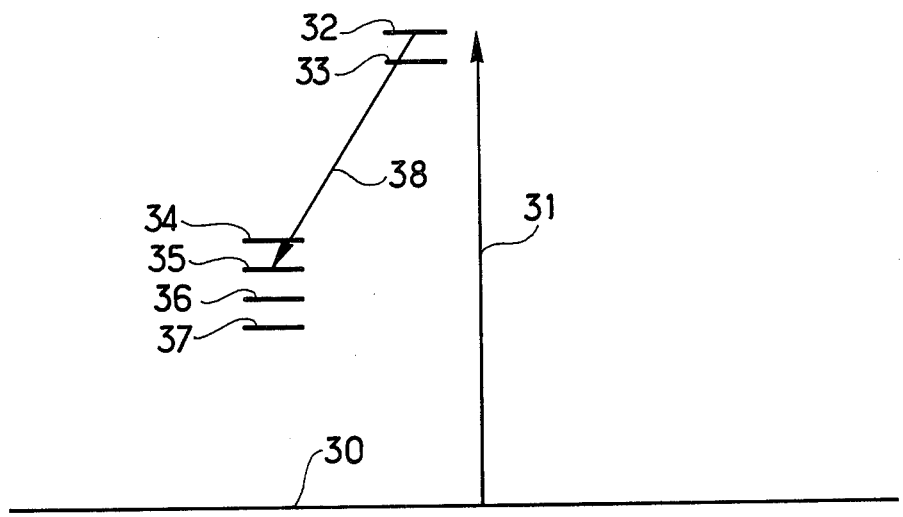

FIG. 3 is the diagram of the iodine energy levels. When the active gas of an iodine laser is excited, the electrodes change over from the fundamental state 30 to a higher state in the direction of the arrow 31, this higher state comprising two sub-levels 32 and 33. The de-energizing level of the electrons comprises four sub-levels 34, 35, 36 and 37. The laser emission can therefore take place along 8 lines (6 of which are, in fact, allowed) corresponding to the combinations of the two higher sub-levels with the four lower sub-levels. The difference in wavelength between the various emission lines of the iodine is very small, in the order of $10^{-4}$ microns, the average wavelength being 1.315 microns.

The emission lines of the glass which are close to 1.3 microns amply cover the various lines of the iodine. The result of this is that the signal radiation spectrum 18 (see FIG. 1) entering the amplifier 13, covers all the emission wavelengths of the iodine. In these conditions, the signal 18 passing through the amplifier 13 is amplified at the frequencies of the various emission lines of the iodine and the power of the pulse obtained at the output of the amplifier 13 is much greater than in the known device, in which the signal radiation wavelength leaving the iodine oscillator corresponds to only one emission line.

In the case where the laser device emitting at 1.3 microns is used for producing plasmas, it is often necessary to generate a pulse which lasts about 0.1 nanoseconds. The device shown in FIG. 1 then has the advantage of providing pulses which are shorter than those of known devices. Indeed, it is much easier to obtain locked mode short pulses in a glass laser than in an iodine laser. Whereas an iodine laser oscillator enables pulses lasting about 0.5 nanoseconds to be obtained, a glass oscillator can emit signals which last about 10 to 50 picoseconds. In the device shown in FIG. 1, the duration of the pulse is brought to a higher value, which can be close to 0.1 nanoseconds, after having passed through the amplifier 13. This increase in the duration of the pulse results from the fact that the spectral width of the signal entering the amplifier is greater than the pass band of the amplifier.

Finally, it should be observed that it is possible to adjust the duration of the output pulse by making the pressure of the gases of the amplifier 13 vary by operating the device 14.

Another embodiment of the device embodying the invention, shown in FIG. 4, differs from the one shown in FIG. 1 essentially in that the laser oscillator does not operate in locked modes. In FIG. 4, a resonant optical cavity formed by two reflectors 41 and 42 centred on an axis 43 contains a neodymium-doped glass rod 44 provided with excitation means, not shown, and a pulse triggering device comprising a Pockels cell 45 and a polarizer 46. The light pulse leaving the cavity, lasting about 30 nanoseconds, passes through a cutting element comprising an electro-optical modulator such as a Pockels cell 50 disposed between two crossed polarizers 51 and 52. This element allows only a fraction of the light energy of the pulse to pass, this fraction lying in a time interval which can be in the order of one nanosecond. This fraction of light energy constitutes a signal 58 which is then amplified by passing through an iodine gas amplifier 53 possibly provided with means 54 for varying the gas pressure.

The device shown in FIG. 4 comprises selective means for allowing the passing in the amplifier 53 of the radiation of the signal 58 situated in a wavelength range covering the emission lines of the neodymium-doped glass close to 1.3 microns, this range excluding the emission lines of the neodymium-doped glass close to 1.06 microns and to 0.9 microns. These selective means comprise multidielectric layers 55 and 56 deposited respectively on the surface of the reflectors 41 and 42 and an interference filter 57.

The operation of the device shown in FIG. 4 is analogous to the one shown in FIG. 1. This device also makes it possible to obtain output pulses which are more powerful than those of known devices. However, the device shown in FIG. 4 is less well adapted to the generating of output pulses lasting about 0.1 nanoseconds: indeed, the duration of the signal 58 leaving the oscillator is limited downwards by the possibilities of the cutting system, i.e. at a duration of about one nanosecond.

The device according to the present invention can be applied when it is required to obtain short high-power light pulses and more especially for studying dense hot plasmas.

Of course, the invention is in no way limited to the embodiments described and illustrated, which have been given only by way of example. Thus, the light modulator, suitable for making the oscillator operate in locked modes can also be an electro-optical modulator or a saturable absorbent and several amplifiers such as the amplifier 13 can be disposed in series at the output of the oscillator. Moreover, the laser oscillator emitting on the wavelength of 1.3 microns with a spectral width which is sufficient to cover the lines of the iodine, can be not only a neodymium-doped glass oscillator, but also a neodymium-doped crystal or neodymium-doped liquid oscillator.

What I claim is:

1. A laser generator device emitting at a wavelength close to 1.3 microns, said device comprising:
   a laser oscillator for emitting a light signal, said oscillator including:
   a resonant optical cavity formed by two reflectors, one of which is semi-transparent;
   an active material;
   means for exciting said active material;
   means for triggering at least one light pulse in said cavity containing the excited active material; and
   at least one amplifier disposed at the output of said oscillator, said amplifier comprising an active gas constituted by an iodine compound and means for exciting said active gas; and wherein the active material of said oscillator is an active material doped with neodymium and has selective means for allowing the passing in said amplifier of the radiation of said signal situated in a wavelength range covering the emission lines of the neodymium close to 1.3 microns and the various emission lines of said active gas, said wavelength range excluding the neodymium emission lines close to 1.06 and 0.9 microns.

2. A device according to claim 1, wherein said oscillator comprises a cutter element for said pulse, which element lets only a fraction of the light energy of the pulse pass, the fraction lying in a short interval of time, and said signal being constituted by the said fraction of light energy.

3. A device according to claim 1, wherein said oscillator comprises a light modulator disposed in said cavity so that the oscillator will emit a series of locked mode pulses and means disposed at the output of said cavity to allow only one of these pulses to pass into said amplifier and to stop the other pulses, said signal being constituted by that pulse of the series which passes through the amplifier.

4. A device according to claim 1, further comprising means for adjusting the pressure of the active gas of said amplifier.

5. A device according to claim 1, wherein said selective means for allowing the passage in the amplifier of the radiation of said signal situated in an interval whose wavelength covers the emission line of the neodymium close to 1.3 microns and the various emission lines of said active gas comprises an interference filter.

6. A device according to claim 1, wherein said selective means for allowing the passage through said amplifier of the radiation of said signal situated in an interval whose wavelength covers the emission line of the neodymium close to 1.3 microns and the various emission lines of said active gas, comprises treated reflecting surfaces of the reflectors of the optical cavity of said oscillator.

7. A device according to claim 2, wherein said cutter element comprises an electro-optical modulator.

8. A device according to claim 3, wherein the means disposed at the output of said cavity to allow only one pulse to pass through the amplifier out of said sequence of pulses comprises an electro-optical modulator inserted between two crossed polarizers.

9. A device according to claim 3, wherein said light modulator comprises an acousto-optical modulator.

10. A device according to claim 1, wherein said means for triggering at least one light pulse in said cavity comprise an electro-optical modulator and a polarizer disposed in the cavity.

11. A device according to claim 1, wherein said active material is neodymium-doped glass.

12. A device according to claim 1, wherein said active material is a neodymium-doped crystal.

13. A device according to claim 1, wherein said active material is a neodymium-doped liquid.

14. A device according to claim 1, wherein said selective means for allowing the passage in the amplifier of the radiation of said signal situated in an interval whose wavelength covers the emission line of the neodymium close to 1.3 microns and the various emission lines of said active gas comprises a grating.

15. A device according to claim 1, wherein said selective means for allowing the passage in the amplifier of the radiation of said signal situated in an interval whose wavelength covers the emission line of the neodymium close to 1.3 microns and the various emission lins of said active gas comprises a Pérot-Fabry etalon.

16. A device according to claim 3, wherein said light modulator comprises an electro-optical modulator.

17. A device according to claim 3, wherein said light modulator comprises a saturable absorber.

* * * * *